US008880935B2

(12) United States Patent
Fox et al.

(10) Patent No.: US 8,880,935 B2
(45) Date of Patent: Nov. 4, 2014

(54) REDUNDANCY AND LOAD BALANCING IN REMOTE DIRECT MEMORY ACCESS COMMUNICATIONS

(75) Inventors: Michael J. Fox, New Hill, NC (US); Jeffrey D. Haggar, Holly Springs, NC (US); David A. Herr, Apex, NC (US); Hugh E. Hockett, Raleigh, NC (US); Constantinos Kassimis, Cary, NC (US); Benjamin P. Segal, Hyde Park, NY (US); Jerry W. Stevens, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 13/494,831

(22) Filed: Jun. 12, 2012

(65) Prior Publication Data
US 2013/0332767 A1  Dec. 12, 2013

(51) Int. Cl.
*G06F 11/00* (2006.01)
*G06F 11/20* (2006.01)

(52) U.S. Cl.
USPC ............................ 714/4.11; 714/4.12; 370/225

(58) Field of Classification Search
CPC ........................... G06F 11/1008; G06F 16/163
USPC .................. 714/4.11, 4.12, 42; 370/225, 228
See application file for complete search history.

(56) References Cited

U.S. PATENT DOCUMENTS

| 5,701,413 | A | 12/1997 | Zulian et al. |
| 6,721,806 | B2 | 4/2004 | Boyd et al. |
| 7,114,096 | B2 * | 9/2006 | Freimuth et al. ................. 714/13 |
| 7,551,614 | B2 * | 6/2009 | Teisberg et al. ............... 370/389 |
| 7,580,415 | B2 * | 8/2009 | Hudson et al. ............. 370/395.6 |
| 7,971,236 | B1 * | 6/2011 | Lentini .............................. 726/6 |
| 8,473,692 | B2 | 6/2013 | Rosales et al. |
| 8,627,136 | B2 * | 1/2014 | Shankar et al. .............. 714/4.11 |
| 2003/0037178 | A1 | 2/2003 | Vessey et al. |
| 2004/0049774 | A1 * | 3/2004 | Boyd et al. ..................... 719/312 |
| 2006/0129676 | A1 * | 6/2006 | Modi et al. ..................... 709/227 |
| 2006/0168274 | A1 * | 7/2006 | Aloni et al. ................... 709/230 |
| 2007/0028138 | A1 | 2/2007 | Noya et al. |
| 2007/0060366 | A1 | 3/2007 | Morrow et al. |
| 2008/0034418 | A1 | 2/2008 | Venkatraman et al. |
| 2010/0217916 | A1 | 8/2010 | Gao et al. |
| 2012/0198188 | A1 | 8/2012 | Coronado et al. |
| 2013/0031341 | A1 | 1/2013 | Ganti et al. |
| 2013/0332677 | A1 | 12/2013 | Fitzpatrick et al. |

* cited by examiner

*Primary Examiner* — Joseph Schell
(74) *Attorney, Agent, or Firm* — Parashos T. Kalaitzis; Robert C. Rolnik

(57) ABSTRACT

A system for managing communications to add a first Remote Direct Memory Access (RDMA) link between a TCP server and a TCP client, where the first RDMA link references first remote memory buffer (RMB) and a second RMB, and further based on a first remote direct memory access network interface card (RNIC) associated with the TCP server and a second RNIC associated with the TCP client. The system determines whether a third RNIC is enabled. The system adds a second RDMA link, responsive to a determination that the third RNIC is enabled. The system detects a failure in a failed RDMA link. The system reconfigures the first RDMA link to carry at least one TCP message of a connection formerly assigned to the failed RDMA link, responsive to detecting the failure. The system communicates at least one message of the at least one connection on the first RDMA link.

12 Claims, 6 Drawing Sheets

US 8,880,935 B2

REDUNDANCY AND LOAD BALANCING IN REMOTE DIRECT MEMORY ACCESS COMMUNICATIONS

BACKGROUND

The present invention relates to a computer implemented method, data processing system, and computer program product for communicating between local or at least one remote logical partitions and more specifically to establishing, maintaining, and switching among non-redundant and redundant communications between nodes.

InfiniBand®, Remote Direct Memory Access (RDMA) and RDMA over Converged Ethernet (RoCE) are technologies for high speed connectivity between hosts and servers. InfiniBand is a registered trademark of the InfiniBand Trade Association.

There is a large existing base of servers, applications, and clients that are coded to the transport control protocol/internet protocol (TCP/IP) sockets interface for communication. TCP/IP sockets communication can be too heavy, particularly in environments where virtualization permits the application of techniques to remove overhead in processing in passing data among logical partitions. In particular, some form of response or reaction is necessary to compensate for errors that can occur in connections that are formed using alternate connection methods.

Remote Direct Memory Access communications between nodes in a network lacks transparent "end to end" redundancy, load balancing and dynamic bandwidth rightsizing in the current art. When RDMA communication paths fail they must be recovered either manually, by the operator or system administrator, or programmatically, by the endpoint applications. The latter method requires rewriting existing applications to include RDMA recovery semantics, which is burdensome. Transparent recovery from failures and/or errors in RDMA fabric could be helpful.

SUMMARY

According to one embodiment of the present invention, a computer implemented method, system and computer readable storage medium for managing communications is herein described. A system adds a first Remote Direct Memory Access (RDMA) link between a transport control protocol (TCP) server and a TCP client, where the first RDMA link references a first remote memory buffer (RMB) and a second RMB, and further based on a first remote direct memory access network interface card (RNIC) associated with the TCP server and a second RNIC associated with the TCP client. The system determines whether a third RNIC is enabled on at least one of the TCP server or TCP client. The system adds a second RDMA link having at least one selected from the group consisting of a third RNIC and a fourth RNIC, wherein the second RDMA link references at least one common RMB selected from the group consisting of the first RMB and the second RMB, responsive to a determination that the third RNIC is enabled on at least one of the TCP server and TCP client. The system detects a failure in a failed RDMA link, wherein the failed RDMA link is the second RDMA link. The system reconfigures the RDMA link group so that at least one TCP message of a TCP connection formerly assigned to the failed RDMA link flows over a surviving RDMA link, responsive to detecting the failure. The system communicates at least one TCP message of the at least one TCP connection on the first RDMA link.

A further embodiment may be directed to adding a first remote direct memory access (RDMA) link between a transport control protocol (TCP) server and a TCP client, wherein the first RDMA link references a first remote memory buffer (RMB) and a second RMB, and further based on a first remote direct memory access network interface card (RNIC) associated with the TCP server and a second RNIC associated with the TCP client. The system may determine whether a third RNIC is enabled on at least one of the TCP server and TCP client. Further, the system, responsive to a determination that the third RNIC is enabled on at least one of the TCP server and TCP client, may add a second RDMA link having at least one selected from the group consisting of a third RNIC and a fourth RNIC, wherein the second RDMA link references at least one common RMB selected from the group consisting of the first RMB and the second RMB.

DETAILED DESCRIPTION

Figure 1:
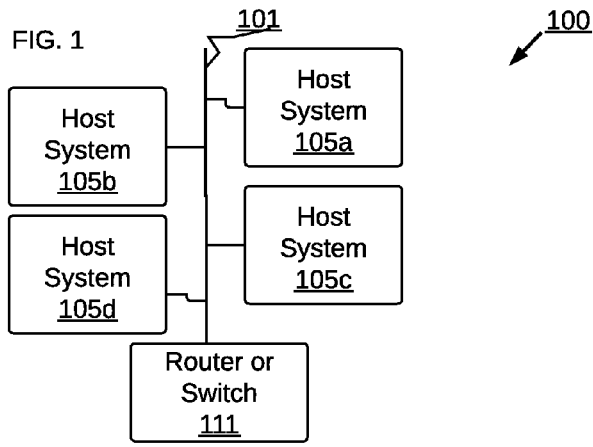
FIG. 1 is a block diagram of an embodiment of a system in accordance with an illustrative embodiment of the invention.

Referring to FIG. 1, a system is designated generally by the numeral 100. System 100 includes a local area network (LAN) 101. In the embodiment of FIG. 1, LAN 101 is an Ethernet network. LAN 101 includes several host systems 105. LAN 101 may be a virtual LAN. Host systems 105 may be logical partitions or any suitable computing devices, such as personal computers. In addition, host systems 105 can be interconnected through a switch, such as, for example or switch 111.

Figure 2:
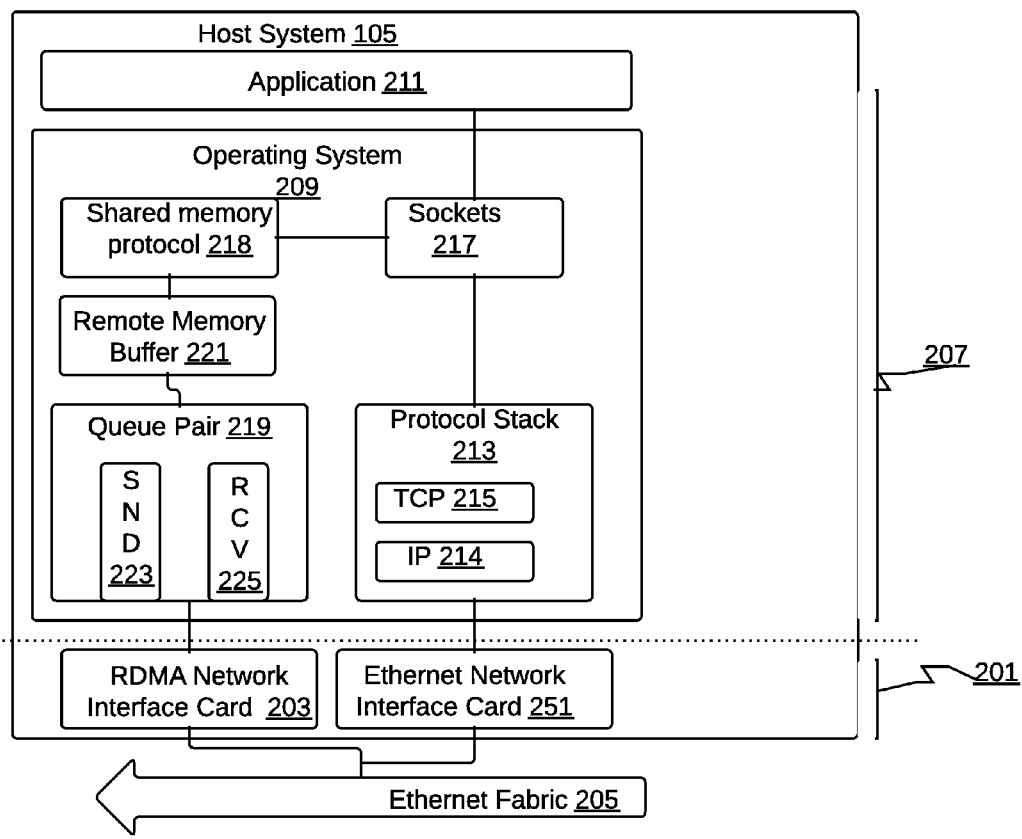
FIG. 2 is a block diagram of an embodiment of a host system in accordance with an illustrative embodiment of the invention.

FIG. 2 illustrates an embodiment of a host system in accordance with an illustrative embodiment of the invention. The FIG. 2 embodiment may be implemented in a computer system such as the one illustrated in, for example, in FIG. 6. Host system 105 can include hardware components indicated generally at 201, for example, a Remote Direct Memory Access (RDMA) network interface card 203, also known as RNIC. RNIC 203 provides connectivity to an Ethernet fabric 205. Ethernet fabric can be a physical Ethernet that relies on racks, cables, connectors and other physical media. Ethernet fabric can be a virtualized Ethernet. A virtualized Ethernet is a communication path that replaces jacks, cables, connectors and other physical media with backplanes and busses and a durable memory resource to exchange data. An Ethernet fabric can be, for example, RDMA over Converged Ethernet (RoCE). Ethernet fabric can be facilitated by, for example, router or switch 111 of FIG. 1. An RNIC is a hardware adapter that performs RDMA operations, for example, reading and writing to and from peer computer memory. A peer computer is a computer that is isolated, either by reason of being embodied in a separate logical partition or by reason of using physically isolated hardware from the RNIC. An Ethernet NIC provides standard Ethernet connectivity, for example for the use of TCP/IP. It is understood that embodiments may use separate NICs as shown here, or a combined NIC with both RDMA and standard Ethernet capabilities. Ethernet NIC 251 provides a pathway from protocol stack 213 to ethernet fabric 205.

A host system also includes software components, indicated generally at 207, including an operating system 209 and at least one application 211. Operating system 209 includes various programs, such as device drivers, data, and data structures, and provides common services for various application programs, such as application 211. Application 211 may be any program, such as a web browser, email client, or the like.

Embodiments enable end-to-end connections across LAN 101 (of FIG. 1) between application 211 processes running on host systems 105. Accordingly, application 211 may communicate with applications running on other host systems using either TCP/IP connections or RDMA connections. To enable TCP/IP connections, operating system 209 includes a protocol stack 213, which includes among other components, an Internet Protocol (IP) layer 214 and a TCP layer 215. Protocol stack 213 includes executable code and data structures associated with a kernel of operating system 209. The code resides in memory locations associated with the kernel. The data structures are portions of memory that are used by protocol stack 213 code to retain static and dynamic variables.

IP layer 214 receives IP packets from lower level protocol layers of protocol stack 213 and sends TCP segments to TCP layer 215. The IP layer can receive such IP packets from Ethernet network interface card (NIC) 251. TCP layer 215 sends data packets to appropriate sockets 217. Operating system 209 and application 211 create a socket. A socket is a data structure that provides an input and output channel for a process or thread of application 211. Operating system 209 maps a socket to a particular application process or thread. The kernel of the operating system is involved in processing data packets through each layer of protocol stack 213. Each socket 217 is identified by tuple including a source IP address, a source port number, a destination IP address and a destination port number. Socket 217 can be a data structure that permits communications to flow, on one hand, through shared memory protocol 218, and on the other hand, directly to protocol stack 213. The network interface cards 203 and 251 can be separate cards for RDMA and standard Ethernet. Alternatively, RDMA network interface card 203 and RDMA network interface card 251 can be one card supporting both protocols. An Ethernet NIC provides standard Ethernet connectivity, for example for the use of TCP/IP. It is understood that embodiments may use separate NICs as shown here, or a combined NIC with both RDMA and standard ethernet capabilities.

Now, the form of RDMA connections and its sub-types of shared memory communication (SMC) links, will be explained. An RDMA connection or RDMA link may allow application 211 to write data directly to, and read data directly from, memory associated with applications running on host systems 105. This access of data can avoid the involvement of an operating system kernel. To enable such direct transfers, operating system 209 can allocate a reliably connected queue pair (RC-QP) 219 and remote memory buffer (RMB) 221 to each RDMA connection. Alternatively, the operating system can allocate a shared memory buffer to each RDMA connection. A remote memory buffer is a shared memory buffer that may be referenced by a host across a RDMA over Converged Ethernet (RoCE), InfiniBand link, or the like.

A Shared Memory Communication (SMC) link is a specific type of RDMA link. An SMC link is formed by associating a pair of RC-QPs and adds features to an RDMA standard link such as, for example, transparency to socket based applications, and the ability to dynamically discover SMC capability during a TCP handshake to thereby convert over to using RDMA. The use of RDMA is further described in patent application Ser. No. 13/246,028 titled "Using Transmission Control Protocol/Internet Protocol (TCP/IP) To Setup High Speed Out Of Band Data Communication Connections", herein incorporated by reference. Further SMC link features can include the ability to set up SMC links, which can multiplex multiple TCP connections. The creation of multiple TCP connections can be performed without adding a queue pair and attendant buffer setup for each added TCP connection.

SMC links (RC-QPs) are bound to a specific hardware path (associated with a remote and local RNICs). When additional RNICs are available additional links can be created between the two hosts. The additional links can then be grouped together to form a larger single logical (multi-path) link or link group. The link group can dynamically expand (adding additional links) or contract (remove links) as needs for bandwidth change. In other words, if an application changes demand, further RDMA links and/or SMC links can be provisioned in response to the changed demand. The underlying TCP traffic can be load balanced over any link within the group. In addition, after adding an additional RDMA link to an existing RDMA link between two hosts, the TCP peers transmit data at a data rate higher than they transmitted prior to adding the second RDMA link by virtue of the plural RDMA links.

Illustrative embodiments can identify an RDMA connection during the setup of a TCP/IP connection between host system 105a and host system 105b, and then perform the actual data communication between the host system and the remote host using the RDMA connection identified during the TCP/IP connection setup and/or identification to establish one or more redundant features to the RDMA link. In other words, if, among one or more RDMA links that bridge a server and a TCP client, there is a failure in one part of the RDMA link(s), then the client and server can recover by redirecting TCP messages of a connection formerly assigned to the failed link to the one or more surviving RDMA links. The term 'remote', as used herein merely describes a host or logical partition that is distinct from another or 'local' host. The local host and the remote host may both rely on resources in a data center, within a frame of computer equipment, or even within a single motherboard. At a minimum, the local host and the remote host are isolated or isolatable so that arbitrary code is not executed on one host that is sourced from another host. A TCP message is a unit of data of arbitrary size that is not limited to size restrictions that may be present at an underlying internet protocol (IP) layer. The TCP message is the data that an application sends to its corresponding application in another computer system. A TCP connection is the state information and allocated memory necessary to support, maintain, and, if needed, transfer functionality to a redundant TCP connect, if available.

Figure 3:
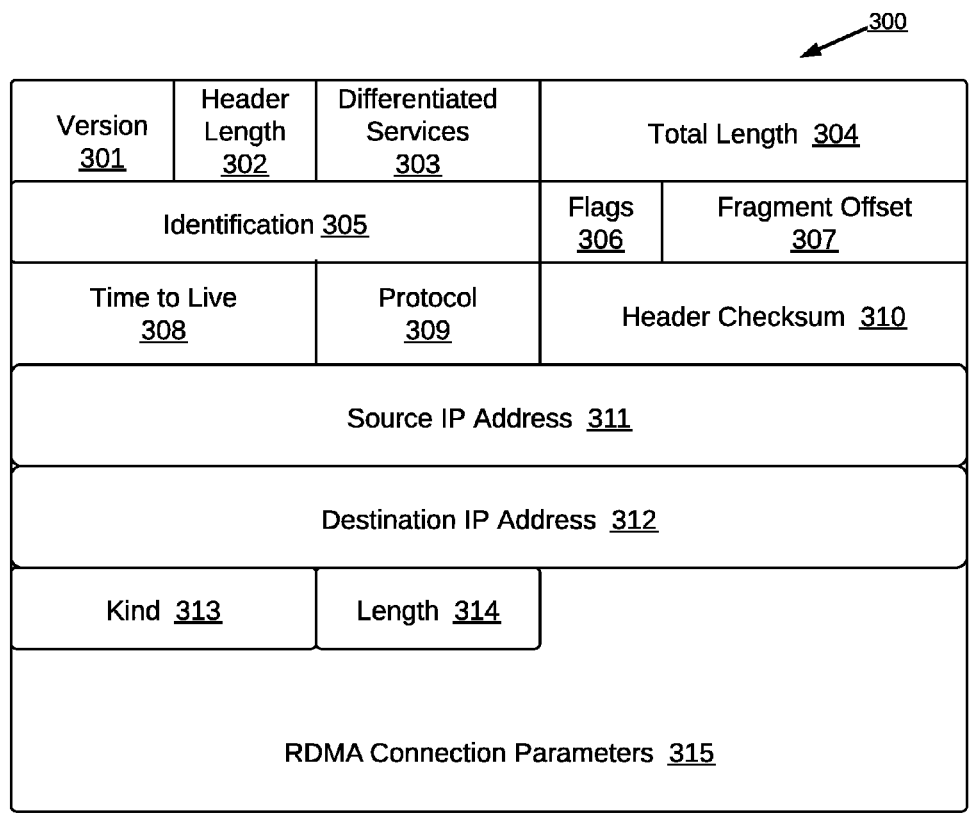
FIG. 3 is a pictorial view of an embodiment of an Internet Protocol version 4 (IPv4) header in accordance with an illustrative embodiment of the invention.

FIG. 3, shows an Internet Protocol version 4 (IPv4) header 300 in accordance with an illustrative embodiment. IP header 300 has twelve mandatory fields and optional option extensions. The twelve mandatory fields are version 301, header length 302, differentiated services 303, total length 304, identification 305, flags 306, fragment offset 307, time to live 308, protocol 309, header checksum 310, source IP address 311, and destination IP address 312.

Header length 302 is a 4-bit field that specifies the number of 32-bit words in header 300. The minimum header length is five, and the maximum header length is fifteen. Thus, ten 32-bit words are available for options extensions. Protocol 309 is an 8-bit field that specifies the protocol used in the data portion of the IP datagram, which may be TCP.

According to illustrative embodiments, the options extensions include RDMA connection information. An 8-bit kind field 313 identifies the option kind as RDMA. The internet protocol standard currently specifies several kind codes. Any unassigned kind code may be used to specify RDMA. An 8-bit length field 314 specifies the length of the RDMA connection information. An RDMA connection parameters field 315 contains the parameters that identify the RDMA connection. The parameters and the length of the RDMA options extension depend on the context of the IP header. RDMA connection parameters field may include padding to fill unused space in the options portion of the header. It should be recognized that RDMA options may be implemented using Internet Protocol version 6 (IPv6) extension headers, which follow the IPv6 header format. Alternatively, RDMA options may be included in a TCP header rather than in an IP header. As can be appreciated, TCP and IP protocols are merely examples of illustrative embodiments. Other embodiments may use TCP or IP headers to indicate willingness to negotiate for an SMC link, and then perform the actual negotiation as a separate flow once the TCP connection is set up. Further embodiments may extend other protocols to achieve the redundant features described.

Figure 4:
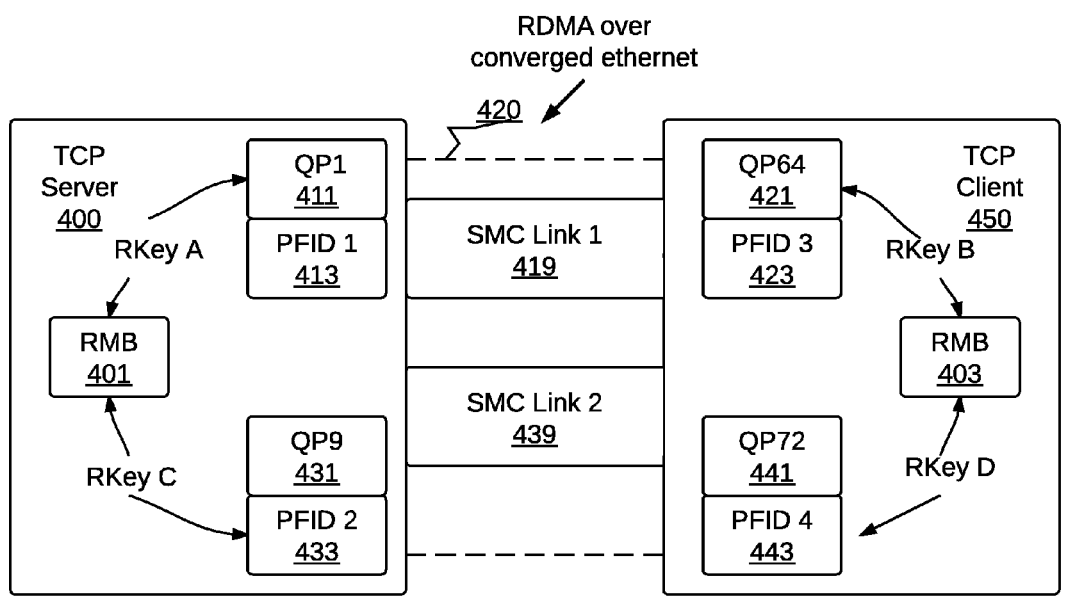
FIG. 4 is a block diagram of the logical configuration of a TCP server and a TCP client in accordance with an illustrative embodiment of the invention.

FIG. 4 is a block diagram of the logical configuration of a TCP server and a TCP client in accordance with an illustrative embodiment of the invention. A TCP server 400 may establish plural SMC links to a corresponding TCP client 450. These links, having peer computers at each end, can be built after creating TCP connections that can be relied upon to associate each computer to a remote memory block that is on the peer computer corresponding to each computer. A peer computer is the corresponding opposite end of a TCP connection in relation to a local server. Thus, the TCP client is the peer computer to TCP server 400. Correspondingly, the TCP server is the peer computer to TCP client 450. The arrangement of redundant SMC links permits recovery after a failure in one of the SMC links. After such a failure, plural TCP connections can be multiplexed over a surviving SMC link or links. Accordingly, the TCP server and TCP client can multiplex and load balance over all the SMC links that exist. When one SMC link fails, the TCP server and TCP client can move the connections from a failed link to a surviving link, or another embodiments can redistribute the failed link's connections over multiple surviving links, or use multiple links for load balancing and bandwidth management in the absence of failures.

TCP server 400 has two RNICs, where each one is assigned to a single SMC link. A TCP server can be, for example, host system 105, modified to provide plural RNICs. RDMA operations include, for example, reading and writing to and/or from a peer computer's memory. As such, the RNIC performs the functions of a NIC, but within the context of RDMA communications. A physical function identifier (PFID) is a data structure that represents an RNIC. The RNIC can rely on a remote memory buffer (RMB). A remote memory buffer is a buffer established according to the conventions of shared memory communications, remote, further defined by patent application Ser. No. 13/494,800, titled "Shared Memory Communication Protocol", incorporated by reference herein.

The RNIC provides network, data link and physical layer functionality normally provided by physical network interface cards and corresponding cabling and/or wireless links. The remote memory buffer (RMB) can provide a place for RNICs to write and read data. An RNIC corresponding to a (properly associated) TCP server can direct memory access read/write the data held within the peer's remote memory buffer. Similarly, the server's RMB can be direct memory accessed by a (properly associated) TCP client. As such, the RNIC reduces latencies normally associated with compensating for out of order data, providing over-the-wire data transfer, avoiding collisions and the like.

Nevertheless, errors in reading or writing to an RMB can occur. For example, errors can include RNIC hardware failure, or an operator disabling the RNIC. SMC link 1 419 can be reliant upon an RNIC that is described by PFID 1 413 and the RNIC that is described by PFID 3 423. Further data structures, such as queue pair 1 (QP1) 411 and its correspondent QP64 421 are used to support SMC link 419. Accordingly, SMC link 1 419 can be defined by two queue pairs, two RNICs (at least by reference to their PFIDs), the SMC link identifier and a virtual local area network (VLAN) identifier. SMC link 1 can operate using RDMA over converged Ethernet (RoCE). It is appreciated, that SMC link 1 and SMC link 2 can be any other form of RDMA link.

To mitigate the effects of errors to SMC link 1, or of any SMC link to which SMC link 1 is redundantly associated, the TCP server can set up SMC link 2. SMC link 2 439 is defined by its QP9 431 and QP72 441 as well as its RNIC-managed PFID 2 433 and PFID 4 443. The setup and remedies to its errors are described with further reference to FIG. 5, below.

RMBs are referenced by a remotely corresponding computer through Rkeys. In other words, an Rkey is used to access an RMB that is remote with respect to the computer system that accesses the RMB. If a computer system accesses an RMB that resides within the computer system's resources, it does not need an Rkey. The computer system can use the real memory addresses instead. These Rkeys, rather than reference memory solely by memory base addresses and offsets, permit indirect referencing to the physical memory. An Rkey can be, for example, RKey A and RKey C, used by QP64 and QP72, respectively, to access RMB 401. As such, the Rkeys are abstractions or tokens by which the PFID accesses an RMB. A similar arrangement permits access to RMB 403 at the TCP client side by way of using RKey B and RKey D. In response to an error of a PFID, for example, PFID 2, at least two things occur. First, RKey C and RKey D are invalidated. Second, the TCP connections that formerly relied on RKey C and RKey D are switched to operate over SMC link 1 419 using Rkey A and Rkey B.

SMC link 1 419 and SMC Link 2 439 collectively are grouped into a link group 420. A link group is a set of two or more SMC or RDMA links that exchange data between a specific two logical partitions or operating systems. TCP connections can be multiplexed or load balanced over the links in a link group to ensure optimal bandwidth utilization. In other words, the load between TCP server 400 and TCP client 450 can be link-level load balanced among the individual component links of the link group. Messages sent over the SMC links manage the composition of the link group, including but not limited to: informing peers of the addition or deletion of RNICs, the creation and deletion of additional links into the link group, managing failover scenarios, and for communicating RKeys when RMB are added or deleted from the link group's access. By using these messages and management methods, stacks which support shared memory manage the link group transparently to the applications or other endpoints that use the link group.

Figure 5:
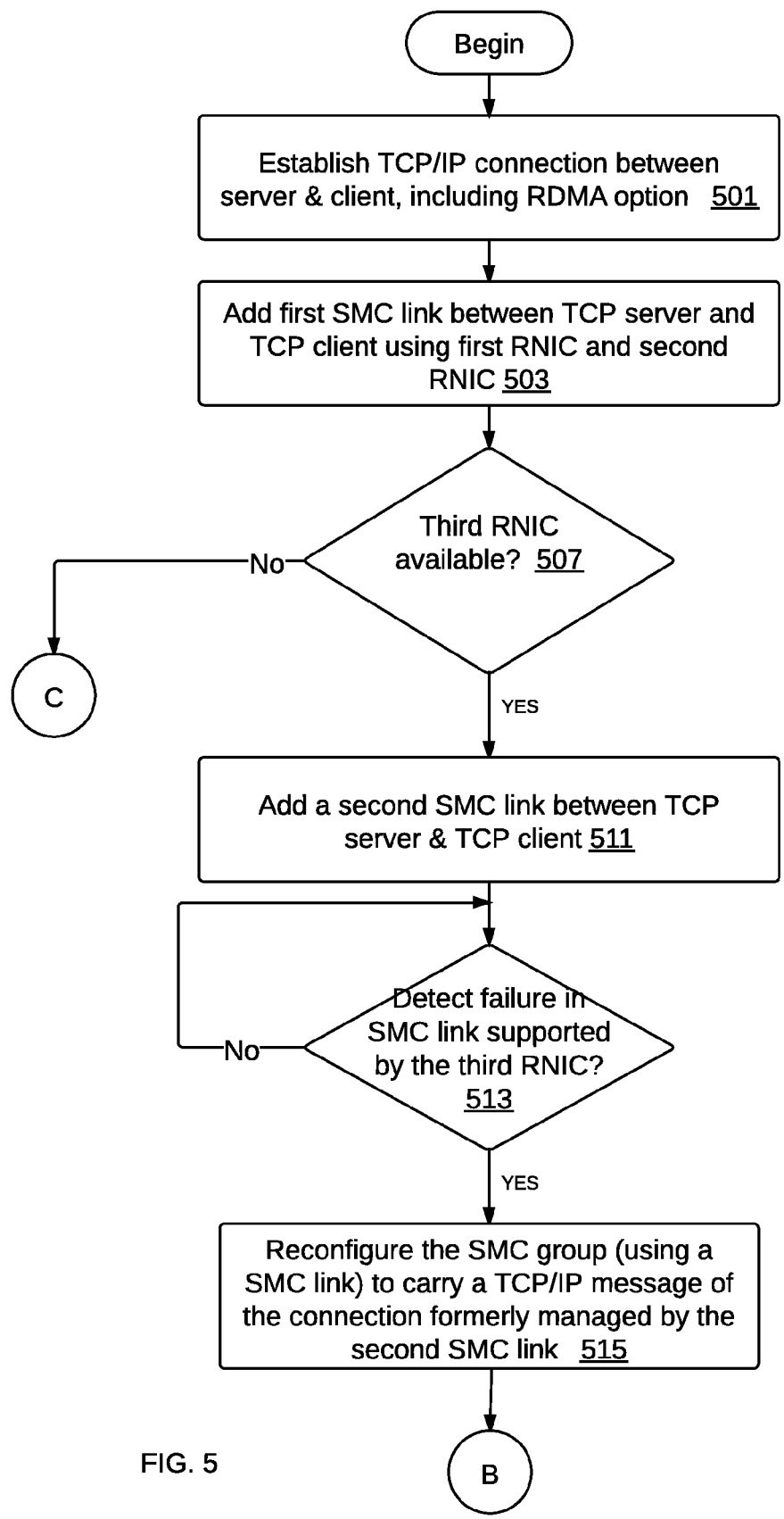
FIG. 5 is a flowchart of SMC link management by a server in accordance with an illustrative embodiment of the invention.
Figure 5:
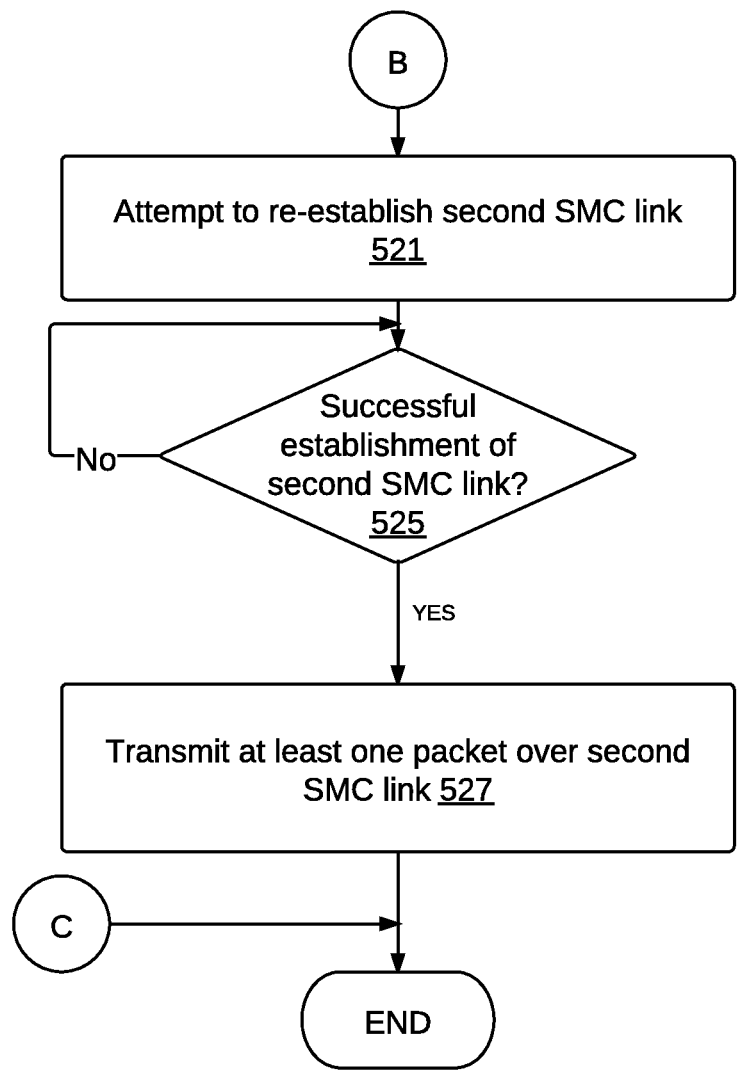

FIG. 5 is a flowchart of SMC link management by a server in accordance with an illustrative embodiment. An SMC link is a more specific form of RDMA link. Initially, the server may establish a TCP/IP connection between server and client (step 501). The establishing of the TCP/IP connection can include the server specifying or otherwise requesting an RDMA option. The server may establish the TCP/IP connection in response to and in coordination with a client, such as TCP client 450 of FIG. 4, above. The description of an initial rendezvous processing which also establishes the initial link of step 501 may be found with reference to Ser. No. 13/246,028 titled "Using Transmission Control Protocol/Internet Protocol (TCP/IP) To Setup High Speed Out Of Band Data Communication Connections", which is herein incorporated by reference.

Next, the server may add a first SMC link between the TCP server and the TCP client using the first RNIC and second RNIC (step 503). The first SMC link is maintained such that the first SMC link references a first remote memory buffer (RMB) and a second RMB. SMC links are based on queue pairs, each of which relies on a first RNIC associated on the TCP server, and a second RNIC on the TCP client. Additionally, a further step after 503 (or part of 503) may transmit a message from TCP server to TCP client. This step can be automatically or manually invoked, and if manually invoked, the message/command specifies the SMC link. Step 511 can be performed iteratively, up to a threshold 'n' that may be set by an operator to the hypervisor and/or limited by the quantity of RNICs available on each peer.

Some messages can be used to exchange tokens or identifiers of memory and throughput (among other things) between logical partitions coupled via the links shown in FIG. 4. FIG. 4 represents a state the LPARs can attain after step 511. Some of the messages, below, can be used even when only a single, non-redundant link is established. An "add link" message is a message exchanged over a link to inform a peer LPAR to add a new link to the link group. A "confirm link" message is a message used to conform SMC link connectivity. A "delete link" message is a message that is used to accomplish one of two functions. If the "delete link" originates from a TCP server, the message indicates a link or link group is to be deleted. If the "delete link" originates from the client, the message is a request to delete a link, or the entire link group. A "change link" is a message that tells the peer LPAR to switch TCP connections between links within a link group. A "confirm rkey" is a message that confirms a RMB Rkey add or deletion. A "test link" is a message to verify that the SMC link is active and healthy.

Next, the server may determine whether a third RNIC is available (step 507). In other words, the server may determine if a third RNIC is enabled on at least the server or the TCP client. If no third RNC is enabled, processing may terminate. However, if a third RNIC is enabled, the server may add a second SMC link between the TCP server and the TCP client (step 511). Step 511 may be performed using a third RNIC and a fourth RNIC, if available. This step can be performed using a message/link "add link". The "add link" is transmitted via a previously set-up SMC Link. Further processing can include the "confirm link" directed to the newly added second SMC link.

Next, the server may determine if there is a failure in an SMC link. For example, a failure can occur due to a failed RNIC. Thus, the server may detect a failure in the SMC link supported by the third RNIC (step 513). A failure is any hardware or software anomaly that blocks or degrades communications between applications. If no failure is detected, the server can repeat step 513. It is appreciated that, as part of detecting failure in the SMC link, plural RNICs may be tested. For example, the server may test all RNICs currently in use between a server and TCP client. In any event, the positive determination at step 513 can result in the server reconfiguring the link group, provided that the first link continues to operate with its assigned RNICs, to carry at least one or TCP message of the connection formerly assigned to the second SMC link (step 515). As a part of using the first SMC link, or surviving link, the server may transmit actual packets of the connection over the first SMC link. Step 515 may include retransmitting all undelivered messages of the TCP connections that were previously associated with the failed link. Such retransmitting is performed over a surviving SMC link. The surviving link can now reference an RMB that it has in common with the failed SMC link. In other words, the common RMB is the RMB that is present on either the server or client side, that was previously referenced by both the surviving SMC link and the failed SMC link. It should be noted that either the TCP server or the TCP client can initiate the steps of FIG. 5.

Next, the server may attempt to re-establish redundancy to the first SMC link (step 521). This attempt involves creating or adding another SMC link between the server and the same TCP client to which the first SMC link is associated. Several different strategies may be taken to attempt to re-establish redundancy. For example, the new SMC link may be established to re-use a feature of the first SMC link, such as, for example, a PFID. Accordingly, the server may add at least one third SMC link that uses a physical function identifier (PFID) also used by the first SMC link at either a TCP server side or a TCP client side. This first situation is called an asymmetric redundant SMC link configuration. As a condition to making dual use of a PFID already in use by the first SMC link, the server may verify that the correspondent PFID on the remote server or client is not assigned to dual use by the first SMC link and the to-be-added SMC link.

Alternatively, the server may set up at least one third SMC link that uses a third PFID and a fourth PFID, wherein the third PFID and the fourth PFID are currently unused by the first SMC link. In this second situation, a first PFID is associated with the first RNIC, and a second PFID is associated with the second RNIC. This second situation is called a symmetric redundant SMC link configuration. In other words, a symmetric redundant SMC link configuration builds each SMC link with separate and distinct RNICs and PFIDs at each peer to the respective SMC links. Nevertheless, the symmetric redundant SMC link configuration's first SMC link and third SMC link rely on a single RMB at the server side and a single RMB at the client side. Reliance on a single RMB provides some efficiencies.

The server may determine whether a successful establishment of the third SMC link occurred (step 525). The server, in the process of establishing a redundant SMC link, in this case may initially attempt establishing an asymmetric redundant SMC link configuration, and later configure that SMC link to the more-robust symmetric redundant SMC link configuration. If the first of these two steps fails, the server will, at least temporarily, be unable to use the redundant SMC link, since the initial step to create a new SMC link has failed. Assuming that such an attempt fails, step 525 may be repeated indefinitely.

The server may set up a new SMC link responsive to receiving a client indication that a client has an RNIC that is currently unused. The client may cause this indication by sending an "add link" message to the server over an existing SMC link in the link group. Consequently, in response to receiving the client indication that the client has an RNIC that is currently unused, the server can add the third SMC link based on the unused RNIC.

On the other hand, in case at least the first step is successful, and step 525 is determined positively, the server may transmit at least one packet over the second SMC link (step 527). This packet may be sent in response to a new TCP/IP connection being established, rather than sending packets of a TCP/IP connection established on the first SMC link. In other words, the server can achieve load balancing by establishing a rough balance of TCP/IP connections as connections are added to the second SMC. Processing may terminate thereafter.

Many kinds of failures can cause the embodiments to take remedial action to at least redirect packets to a surviving SMC link. For example, a failure can be detected by the server detecting a bad return code. Alternatively, the server may detect a manual operator-state-transition of an RNIC. A manual operator-state-transition is a user initiation of a teardown of RNIC functionality. This transition could occur because the operator instructs a server or a TCP client to disable or otherwise take an RNIC out of service. This transition could occur as a follow-on effect of a user reallocating a resource necessary for the RNIC's proper functioning, such as reallocating memory used to support a QP of the RNIC.

A TCP connection can be added to the second SMC link. The server, if it detects that a redundant SMC link is available, can direct TCP messages on the first SMC link or the second SMC link to load-balance the links. The illustrative embodiments directly place message data to remote memory. In other words and in contrast to the more elaborate TCP/IP stack, message data is never placed into an actual packet. This approach means there are no packets to get out of order. Such remote writing to a contiguous remote buffer assures a correct data ordering. This occurs because the writing uses offsets based on an Rkey that represents specific write locations. Messages transmitted to the TCP client can arrive to the RMB, such as RMB 403 of FIG. 4, out of time-ordered sequence. Nevertheless, the protocol stack places such messages into sequential order so that a late-arriving message is placed between received packets in memory so that the order of the packets, as memory is traversed sequentially, is in the order the messages were dispatched.

A striping feature is concerned with load balancing in a fine gradation. Accordingly, instead of a TCP connection being associated to one SMC link, the TCP connection can be associated to multiple SMC links. Thus, the successive writes for that connection can be round-robined over the SMC links. In this case, ordering is still not a problem because all of the writes are to a contiguous buffer and each write knows where its data is to be placed in the buffer.

Accordingly, one or more embodiments may set-up RDMA links in a redundant configuration, detect failures in at least one RDMA link, and/or shift TCP communications reliant on the failed RDMA link to the surviving RDMA link. When able, an embodiment may reconfigure a new redundant RDMA link in response to a failure of an RDMA link and a corresponding fall-back to non-redundant mode. Such reconfiguring may occur on an iterative basis to again re-establish redundancy in the RDMA link. Further, by assigning TCP connections to specific RDMA links (such as, e.g. SMC links), a switch of a TCP connection among such RDMA links is possible where suitable redundancy is established.

Figure 6:
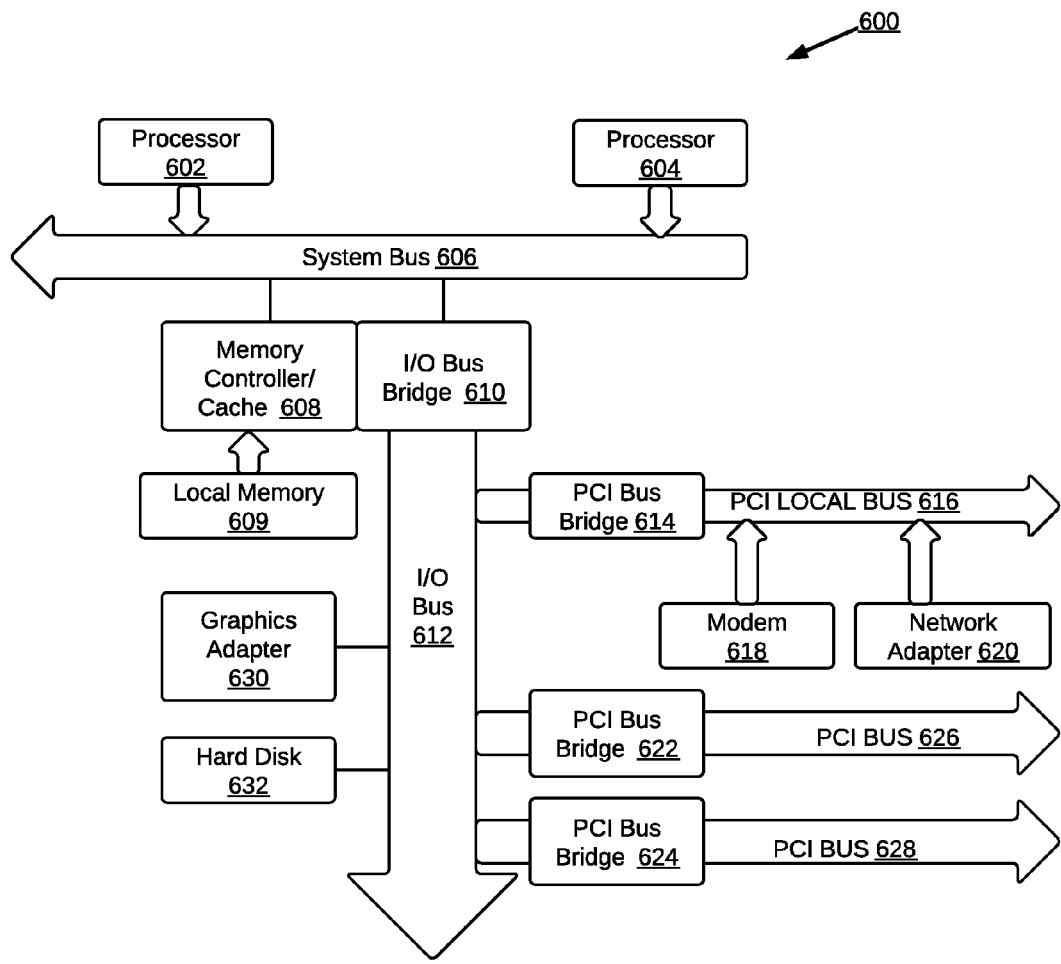
FIG. 6 is a block diagram of a data processing system upon which illustrative embodiments may be implemented.

FIG. 6 is a block diagram of a data processing system upon which illustrative embodiments may be implemented. Data processing system 600 may be a symmetric multiprocessor (SMP) system including a plurality of processors 602 and 604 connected to system bus 606. Alternatively, a single processor system may be employed. Also connected to system bus 606 is memory controller/cache 608, which provides an interface to local memory 609. I/O bus bridge 610 is connected to system bus 606 and provides an interface to I/O bus 612. Memory controller/cache 608 and I/O bus bridge 610 may be integrated as depicted.

Peripheral component interconnect (PCI) bus bridge 614 connected to I/O bus 612 provides an interface to PCI local bus 616. A number of modems may be connected to PCI local bus 616. Typical PCI bus implementations will support four PCI expansion slots or add-in connectors. Communication links to networks may be provided through a modem 618 or a network adapter 620 connected to PCI local bus 616 through add-in boards. Additional PCI bus bridges 622 and 624 provide interfaces for additional PCI local buses 626 and 628, respectively, from which additional modems or network adapters may be supported. In this manner, data processing system 600 allows connections to multiple network computers. A memory-mapped graphics adapter 630 and hard disk 632 may also be connected to I/O bus 612 as depicted, either directly or indirectly.

Among the uses for one or more embodiments are the following. The embodiments may combine the links together to form a single logical multi-link group. The embodiments may continue to add additional links to the group as additional RNICs are provisioned for increased bandwidth. The embodiments can then balance the workloads over the available links within the group. The embodiments may define a set of link layer control messages (commands) that allows the hosts to manage the links and the link groups.

Those of ordinary skill in the art will appreciate that the hardware depicted in FIG. 6 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 6 may be, for example, an IBM® System z® server running z/OS or Linux, or an IBM i Server running the Advanced Interactive Executive (AIX™) operating system. AIX, i Server, and System z are trademarks or registered trademarks of International Business Machines Corporation.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical applications, or technical improvements over technologies found in the marketplace, or to enable others of ordinary skill in the art to understand the embodiments disclosed herein.

As will be appreciated by one skilled in the art, aspects of the present invention may be embodied as a system, method or computer program product. Accordingly, one or more embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage device(s) medium(s) may be utilized. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The term "computer readable storage device" does not encompass a signal propagation media such as a copper cable, optical fiber or wireless transmission media.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A computer program product for managing communications, the computer program product comprising: a computer readable storage device having computer readable program code embodied therewith, the computer readable program code comprising:

computer readable program code configured to add a first remote direct memory access (RDMA) link between a transport control protocol (TCP) server and a TCP client, where the first RDMA link references a first remote memory buffer (RMB) and a second RMB, and further based on a first remote direct memory access network interface card (RNIC) associated with the TCP server and a second RNIC associated with the TCP client;

computer readable program code configured to determine whether a third RNIC is enabled on at least one of the TCP server and TCP client, and in response, add a second RDMA link having at least one selected from the group consisting of a third RNIC and a fourth RNIC, wherein the second RDMA link references at least one common RMB selected from the group consisting of the first RMB and the second RMB;

computer readable program code configured to detect a failure in a failed RDMA link, wherein the failed RDMA link is the second RDMA link;

computer readable program code configured to reconfigure the first RDMA link to carry at least one TCP message of a TCP connection formerly assigned to the failed RDMA link, responsive to detecting the failure;

computer readable program code configured to communicate at least one TCP message of the at least one TCP connection on the first RDMA link; and computer readable program code configured to reconfigure the first RDMA link to carry at least one TCP message of the TCP connection formerly assigned to the second RDMA link, and in response, attempt to re-establish redundancy to the first RDMA link.

2. The computer program product of claim 1, wherein computer readable program code configured to attempt to re-establish redundancy to the first RDMA link further comprises:

computer readable program code configured to add at least one third RDMA link that uses a physical function identifier (PFID) also used by the first RDMA link at either a TCP server side or a TCP client side.

3. The computer program product of claim 1, wherein computer readable program code configured to attempt to re-establish redundancy to the first RDMA link further comprises:

computer readable program code configured to set up at least one third RDMA link that uses a third PFID and a fourth PFID, wherein the third PFID and the fourth PFID are currently unused by the first RDMA link, wherein the first PFID is associated with the first RNIC, and the second PFID is associated with the second RNIC.

4. The computer program product of claim 3, wherein computer readable program code configured to attempt to re-establish redundancy to the first RDMA link further comprises:

computer readable program code configured to configure the third RNIC on one selected from the group consisting of the TCP server and the TCP client.

5. The computer program product of claim 3, wherein computer readable program code configured to attempt to re-establish redundancy to the first RDMA link further comprises:

computer readable program code configured to receive a client indication that a client has an RNIC that is currently unused; and computer readable program code configured to add the third RDMA link based on the RNIC that is unused, responsive to receiving the client indication that the client has a queue pair that is currently unused.

6. The computer program product of claim 1, wherein the first RNIC comprises at least one physical function identifier.

7. A data processing system comprising:

a bus;

a computer readable tangible storage device connected to the bus, wherein computer usable code is located in the computer readable tangible storage device;

a communication unit connected to the bus; and a processor connected to the bus, wherein the processor executes the computer usable code for managing communications, wherein the processor executes the computer usable code to add a first remote direct memory access (RDMA) link between a transport control protocol (TCP) server and a TCP client, where the first RDMA link references a first remote memory buffer (RMB) and a second RMB, and further based on a first remote direct memory access network interface card (RNIC) associated with the TCP server and a second RNIC associated with the TCP client; determine whether a third RNIC is enabled on at least one of the TCP server and TCP client, and in response, add a second RDMA link having at least one selected from the group consisting of a third RNIC and a fourth RNIC, wherein the second RDMA link references at least one common RMB selected from the group consisting of the first RMB and the second RMB; detect a failure of a failed RDMA link, wherein the failed RDMA link is the second RDMA link; reconfigure the first RDMA link to carry at least one TCP message of a TCP connection formerly assigned to the failed RDMA link, responsive to detecting the failure; communicate at least one TCP message of the at least one TCP connection on the first RDMA link, and reconfigure the first RDMA link to carry at least one TCP message of the TCP connection formerly assigned to the second RDMA link, and in response, attempt to re-establish redundancy to the first RDMA link.

8. The data processing system of claim 7, wherein in executing the computer usable code to attempt to re-establish redundancy to the first RDMA link the processor further executes computer usable code to add at least one third RDMA link that uses a physical function identifier (PFID) also used by the first RDMA link at either a TCP server side or a TCP client side.

9. The data processing system of claim 7, wherein in executing the computer usable code to attempt to re-establish redundancy to the first RDMA link the processor further executes computer usable code to set up at least one third RDMA link that uses a third PFID and a fourth PFID, wherein the third PFID and the fourth PFID are currently unused by the first RDMA link, wherein a first PFID is associated with the first RNIC, and a second PFID is associated with the second RNIC.

10. The data processing system of claim 9, wherein in executing the computer usable code to attempt to re-establish redundancy to the first RDMA link the processor further executes computer usable code to configure a third RNIC on one device selected from the group consisting of the TCP server and the TCP client.

11. The data processing system of claim 9, wherein in executing the computer usable code to attempt to re-establish redundancy to the first RDMA link the processor further executes computer usable code to receive a client indication that a client has an RNIC that is currently unused and adds the third RDMA link based on a queue pair that is unused, responsive to receiving the client indication that the client has the RNIC that is currently unused.

12. The data processing system of claim 7, wherein the first RNIC comprises at least one physical function identifier.

* * * * *